(12) United States Patent
Takakura et al.

(10) Patent No.: US 7,610,321 B2
(45) Date of Patent: Oct. 27, 2009

(54) FILE TRANSFER SYSTEM, FILE STORAGE APPARATUS, METHOD FOR STORING FILE, AND PROGRAM

(75) Inventors: Hiroki Takakura, Tokyo (JP); Shiro Miyagi, Tokyo (JP)

(73) Assignee: Sony Corporation (JP)

( * ) Notice: Subject to any disclaimer, the term of this patent is extended or adjusted under 35 U.S.C. 154(b) by 370 days.

(21) Appl. No.: 11/592,111

(22) Filed: Nov. 1, 2006

(65) Prior Publication Data

US 2007/0150527 A1    Jun. 28, 2007

(30) Foreign Application Priority Data

Dec. 27, 2005    (JP)    ............................ P2005-376517

(51) Int. Cl.
*G06F 12/00*    (2006.01)
*G06F 15/16*    (2006.01)

(52) U.S. Cl. ...................................... 707/204; 709/232

(58) Field of Classification Search ................. 707/204, 707/10, 2, 101; 358/1.16; 714/6; 709/250, 709/212, 237, 204, 217, 221, 225, 227, 232
See application file for complete search history.

(56) References Cited

U.S. PATENT DOCUMENTS

| 5,386,545 | A | * | 1/1995 | Gombos et al. | ............. | 707/204 |
| 6,058,428 | A | * | 5/2000 | Wang et al. | ................. | 709/232 |
| 7,260,598 | B1 | * | 8/2007 | Liskov et al. | ............... | 709/201 |
| 7,467,235 | B2 | * | 12/2008 | Kameda | ..................... | 709/250 |
| 7,490,775 | B2 | * | 2/2009 | Biderman | .............. | 235/472.01 |
| 2002/0052952 | A1 | * | 5/2002 | Yoshida et al. | .............. | 709/225 |
| 2003/0195905 | A1 | * | 10/2003 | Morohashi | .................. | 707/204 |
| 2004/0205152 | A1 | * | 10/2004 | Yasuda et al. | ................. | 709/217 |
| 2005/0015657 | A1 | * | 1/2005 | Sugiura et al. | ................. | 714/6 |
| 2005/0144254 | A1 | * | 6/2005 | Kameda | ..................... | 709/217 |
| 2006/0163358 | A1 | * | 7/2006 | Biderman | .............. | 235/472.01 |
| 2007/0078859 | A1 | * | 4/2007 | Arnold | ........................ | 707/10 |
| 2007/0146788 | A1 | * | 6/2007 | Shinozaki et al. | .......... | 358/1.16 |

FOREIGN PATENT DOCUMENTS

JP    10-269120 A    10/1998

* cited by examiner

*Primary Examiner*—Hung T Vy
(74) *Attorney, Agent, or Firm*—Lerner, David, Littenberg, Krumholz & Mentlik, LLP (57) ABSTRACT

A file transfer system includes a source apparatus and a destination apparatus connected to each other via a predetermined transmission path. The source apparatus includes a source-list generating unit generating a first list, a file storing unit, a list rewriting unit, and a file transmitting unit. The destination apparatus includes a destination-list generating unit generating a second list, a destination-list storing unit, a source-list obtaining unit, a determining unit, a transferred-file storing unit, and a destination-list rewriting unit. The destination apparatus obtains the first list held in the source apparatus, compares the first list with the second list to distinguish an untransferred file from files in the source apparatus, and obtains the untransferred file from the source apparatus while the source apparatus does not rewrite the second list.

15 Claims, 8 Drawing Sheets

MEDIUM IDENTIFIER: abcdef123

| IMAGING SEQUENCE NUMBER | FILE NAME |
|---|---|
| 0 | aaa.mpg |
| 1 | bbb.mpg |
| 2 | ccc.mpg |
| 3 | ddd.mpg |

| MEDIUM IDENTIFIER | IMAGING SEQUENCE NUMBER |
|---|---|
| abcdef123 | 3 |
| 5678xzy | 6 |
| ab9218qq | 2 |
| 33456564 | 7 |

FIG. 8

FILE TRANSFER SYSTEM, FILE STORAGE APPARATUS, METHOD FOR STORING FILE, AND PROGRAM

CROSS REFERENCES TO RELATED APPLICATIONS

The present invention contains subject matter related to Japanese Patent Application JP 2005-376517 filed in the Japanese Patent Office on Dec. 27, 2005, the entire contents of which are incorporated herein by reference.

BACKGROUND OF THE INVENTION

1. Field of the Invention

The present invention relates to file transfer systems, and in particular, relates to a file transfer system suitable for transfer of data captured through, for example, a video camera, to an electronic device.

2. Description of the Related Art

In some cases, video files containing image data captured by means of a digital video camera are transferred to a computer because there is a limit on the use of the video files stored in the digital video camera.

In transferring the video files to the computer, it is inefficient to transfer a video file which has already been transferred. According to one approach to solving the problem, only untransferred video files are transferred. For example, Japanese Unexamined Patent Application Publication No. 10-269120 discloses a method for storing information, indicating whether each video file has been transferred, as an index into each of a computer and a video storage device, such as a digital video camera, and determining whether a video file has been transferred from the video camera to the computer on the basis of the indexes transmitted and received between the camera and the computer.

SUMMARY OF THE INVENTION

According to this method, the descriptions of the indexes are updated during a transfer process. If a cable connecting to the digital video camera and the computer is disconnected during the update of the indexes, the transfer process is forcefully terminated even through the description of the index stored in the camera is being updated. Unfortunately, the index stored in the digital video camera may include incorrect information, or the index itself may be corrupted. Disadvantageously, the transfer process cannot be executed again.

The present invention is made in consideration of the above problems. It is desirable to provide a file transfer system, a file storage apparatus, a file storing method, and a program which are capable of reliably transferring a file without rewriting an index file, containing information regarding the transferred and untransferred states of files, stored in a source apparatus.

According to an embodiment of the present invention, there is provided a destination apparatus that a file is transferred to, including the following elements. A generating unit generates a first list containing a unique medium identifier, assigned to a storage medium loaded in a source apparatus that transfers a file, and file information regarding a file transferred from the storage medium. A storing unit stores the first list. A list obtaining unit obtains a second list held in the source apparatus, the second list containing the medium identifier and file information regarding at least one file stored in the storage medium. A determining unit determines each file stored in the storage medium as an untransferred file when the second list does not contain the same medium identifier as that contained in the first list, alternatively, compares the file information in the first list with that in the second list to determine an untransferred file when the second list contains the same medium identifier as that contained in the first list. A transferred-file storing unit instructs the source apparatus to transfer the untransferred file and stores the file, transferred from the source apparatus in response to the instruction, in the storing unit. A destination-list rewriting unit rewrites the first list stored in the storing unit on the basis of the file stored in the storing unit.

The destination apparatus, therefore, obtains the second list held in the source apparatus and compares the obtained list with the first list stored in the destination apparatus, thus distinguishing an untransferred file from files stored in the source apparatus. Advantageously, while the source apparatus does not rewrite the second list, the destination apparatus can obtain the untransferred file from the source apparatus.

According to another embodiment of the present invention, there is provided a source apparatus that transfers a file, including the following elements. A generating unit assigns a unique medium identifier to a storage medium loaded in the apparatus and generates a first list containing the assigned medium identifier and file information regarding at least one file to be stored in the storage medium. A file storing unit stores the first list and the file in the storage medium. A list rewriting unit rewrites the first list stored in the storage medium on the basis of the file stored in the storage medium. A file transmitting unit transmits the file and the first list to a destination apparatus. The first list is compared to a second list held in the destination apparatus in order to determine an untransferred file through the destination apparatus, the second list containing the medium identifier and file information regarding a file transferred from the storage medium.

The destination apparatus, therefore, obtains the first list held in the source apparatus and compares the first list to the second list held in the destination apparatus, thus distinguishing an untransferred file from files stored in the source apparatus. Advantageously, while the source apparatus does not rewrite the first list, the destination apparatus can obtain the untransferred file.

According to further another embodiment of the present invention, there is provided a method for transferring a file, including the steps of generating a first list containing a unique medium identifier, assigned to a storage medium loaded in a source apparatus that transfers a file, and file information regarding a file transferred from the storage medium, storing the first list, obtaining a second list held in the source apparatus, the second list containing the medium identifier and file information regarding at least one file stored in the storage medium, determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list, instructing the source apparatus to transfer the untransferred file and storing the file transferred from the source apparatus in response to the instruction, and rewriting the stored first list on the basis of the stored file.

In this method, therefore, the second list held in the source apparatus is obtained and is then compared to the first list held by the destination apparatus, thus distinguishing an untransferred file from files stored in the source apparatus. Advantageously, while the source apparatus does not rewrite the first list, the destination apparatus can obtain the untransferred file from the source apparatus.

According to another embodiment of the present invention, there is provided a method for managing a file, including the steps of assigning a unique medium identifier to a storage medium loaded and generating a first list containing the assigned medium identifier and file information regarding at least one file to be stored in the storage medium, storing the first list and the file in the storage medium, rewriting the stored first list on the basis of the file stored in the storage medium, and transmitting the file and the first list to a destination apparatus. The first list is compared to a second list held in the destination apparatus in order to determine an untransferred file through the destination apparatus, the second list containing the medium identifier and file information regarding a file transferred from the storage medium.

In this method, therefore, the destination apparatus obtains the first list held in the source apparatus and compares the first list with the second list held in the destination apparatus, thus determining an untransferred file, which is not transferred from the source apparatus to the destination apparatus. Advantageously, while the source apparatus does not rewrite the first list, the destination apparatus can obtain the untransferred file from the source apparatus.

According to another embodiment of the present invention, there is provided a program that allows a computer to execute the functions of generating a first list containing a unique medium identifier, assigned to a storage medium loaded in a source apparatus that transfers a file, and file information regarding a file transferred from the storage medium, storing the first list, obtaining a second list held in the source apparatus, the second list containing the medium identifier and file information regarding at least one file stored in the storage medium, determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list, instructing the source apparatus to transfer the untransferred file and storing the file transferred from the source apparatus in response to the instruction, and rewriting the stored first list on the basis of the stored file.

According to this program, therefore, the second list held in the source apparatus is obtained and is compared to the first list held in the destination apparatus, thus distinguishing an untransferred file from files stored in the source apparatus. Advantageously, while the source apparatus does not rewrite the second list, the destination apparatus can obtain the untransferred file from the source apparatus.

According to another embodiment of the present invention, there is provided a program that allows a computer to execute the functions of assigning a unique medium identifier to a storage medium loaded and generating a first list containing the assigned medium identifier and file information regarding at least one file to be stored in the storage medium, storing the first list and the file in the storage medium, rewriting the stored first list on the basis of the file stored in the storage medium, and transmitting the file and the first list to a destination apparatus. The first list is compared to a second list held in the destination apparatus in order to determine an untransferred file through the destination apparatus, the second list containing the medium identifier and file information regarding a file transferred from the storage medium.

According to this program, therefore, the destination apparatus obtains the first list held in the source apparatus and compares the first list with the second list held in the destination apparatus, thus determining an untransferred file, which is not transferred from the source apparatus to the destination apparatus. Advantageously, while the source apparatus does not rewrite the first list, the destination apparatus can obtain the untransferred file from the source apparatus.

According to another embodiment of the present invention, there is provided a file transfer system including a source apparatus and a destination apparatus connected to each other via a predetermined transmission path. The source apparatus includes the following elements. A source-list generating unit assigns a unique medium identifier to a storage medium loaded in the source apparatus and generates a first list containing the assigned medium identifier and file information regarding at least one file to be stored in the storage medium. A file storing unit stores the first list and the file in the storage medium. A list rewriting unit rewrites the stored first list on the basis of the file stored in the storage medium. A file transmitting unit transmits the file and the first list to the destination apparatus. The destination apparatus includes the following elements. A destination-list generating unit generates a second list containing the medium identifier and file information regarding a file transferred from the storage medium. A destination-list storing unit stores the second list. A source-list obtaining unit obtains the first list held in the source apparatus. A determining unit determines each file stored in the storage medium as an untransferred file when the first list does not contain the same medium identifier as that contained in the second list, alternatively, compares the file information in the first list with that in the second list to determine an untransferred file when the first list contains the same medium identifier as that contained in the second list. A transferred-file storing unit instructs the source apparatus to transfer the untransferred file and stores the file, transferred from the source apparatus in response to the instruction, in the destination-list storing unit. A destination-list rewriting unit rewrites the second list stored in the destination-list storing unit on the basis of the file stored in the destination-list storing unit.

In the file transfer system, therefore, the first list held in the source apparatus is obtained and is compared to the second list held in the destination apparatus, thus distinguishing an untransferred file from files stored in the source apparatus. Advantageously, while the source apparatus does not rewrite the second list, the destination apparatus can obtain the untransferred file from the source apparatus.

According to the above-described embodiments of the present invention, a list held in a source apparatus is obtained and is compared to another list held in a destination apparatus, thus distinguishing an untransferred file from files stored in the source apparatus. Advantageously, while the source apparatus does not rewrite the list held therein, the destination apparatus can obtain the untransferred file from the source apparatus. Accordingly, a file transfer system, a file storage apparatus, a file storing method, and a program which are capable of reliably transferring a file in the above-described structure can be realized.

DESCRIPTION OF THE PREFERRED EMBODIMENTS

An embodiment of the present invention will now be described in detail with reference to the drawings.

(1) Structure of File Transfer System

Figure 1:
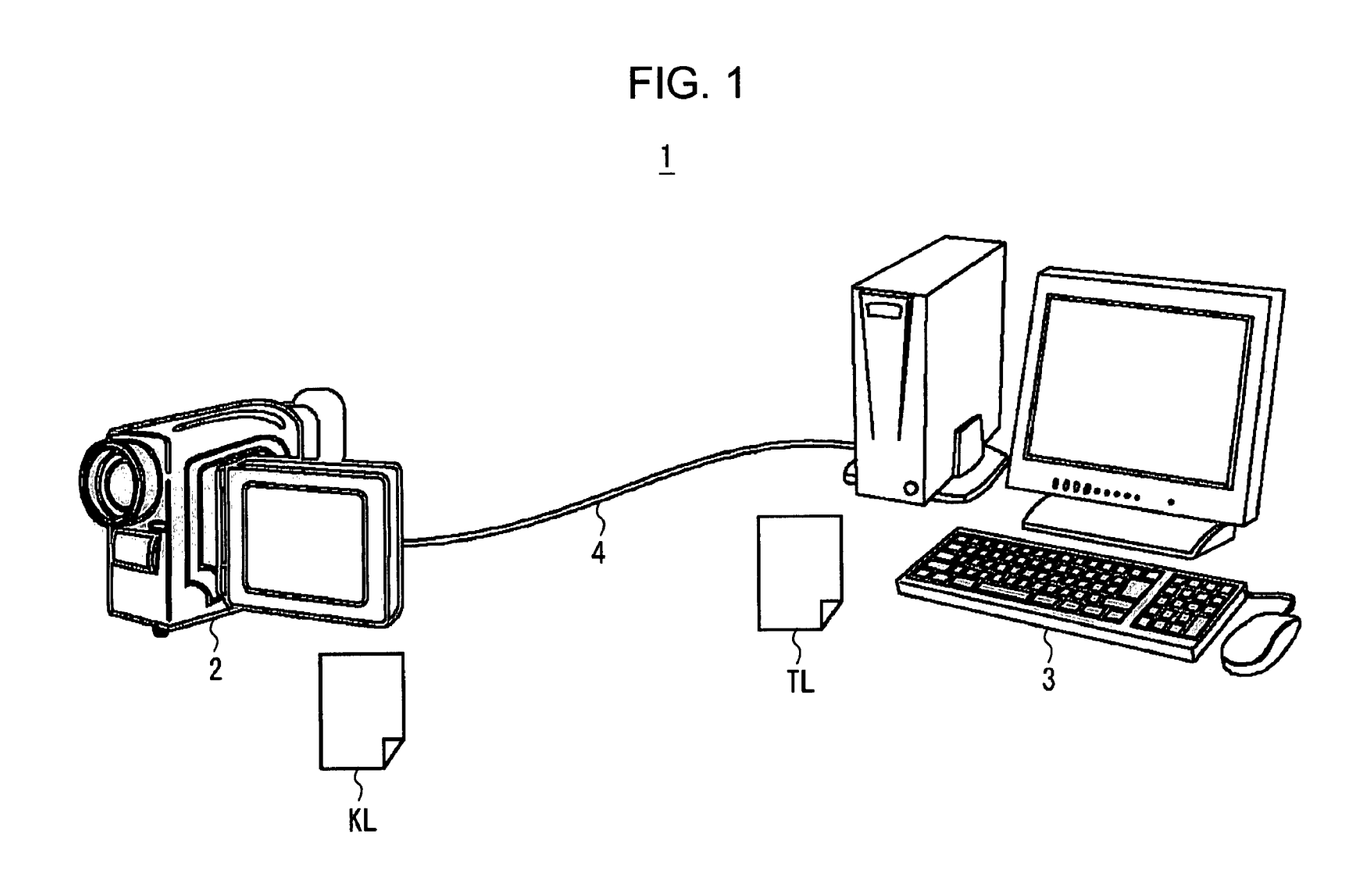
FIG. 1 is a schematic diagram illustrating a file transfer system according to an embodiment of the present invention.

FIG. 1 shows the entire structure of a file transfer system 1 according to the embodiment of the present invention. The file transfer system 1 includes a video camera 2 and a personal computer 3 connected to each other via a cable 4 that complies with a predetermined interface standard, such as Universal Serial Bus (USB).

The video camera 2 captures an image of a subject per predetermined period of time over a duration of time arbitrarily determined in accordance with operation by a user and stores a plurality of images captured over the duration as a file (hereinafter, referred to as a video file) in a storage medium. The video camera 2 may delete a video file selected from video files stored in the storage medium in accordance with a user operation.

After the storage of a first video file in the storage medium, the video camera 2 generates information regarding the association of the video file with the imaging sequence as a table (hereinafter, referred to as a storage management list) and holds the generated storage management list.

Each time the states of video files stored in the storage medium are changed, the video camera 2 updates the corresponding storage management list. When receiving a transfer request from the personal computer 3, the video camera 2 can transfer the video files in accordance with the imaging sequence with reference to the storage management list obtained upon receiving the request.

On the other hand, the personal computer 3 holds information regarding the association of an identifier unique to a storage medium with an imaging sequence number corresponding to the most recently transferred video file as a table (hereinafter, a transfer management list).

On the basis of the transfer management list, the personal computer 3 determines whether a video file has been transferred from the storage medium. If the personal computer 3 has received a video file from the storage medium, the personal computer 3 requests the video camera 2 to transfer one or more untransferred video files.

In this case, the personal computer 3 stores video files, sequentially transferred as untransferred video files from the video camera 2 in accordance with the imaging sequence, in a storage medium, such as a hard disk drive (HDD) or a digital versatile disk (DVD), and updates the transfer management list.

If the personal computer 3 has not received a video file from the storage medium, the personal computer 3 requests the video camera 2 to transfer all of video files.

In this case, the personal computer 3 stores video files, sequentially transferred from the video camera 2 in accordance with the imaging sequence, in the predetermined storage medium and updates the transfer management list.

As described above, in the file transfer system 1, video files stored in the storage medium of the video camera 2 can be stored as objects to be backed up or edited into the storage medium of the personal computer 3.

(2) Structure of Video Camera

Figure 2:
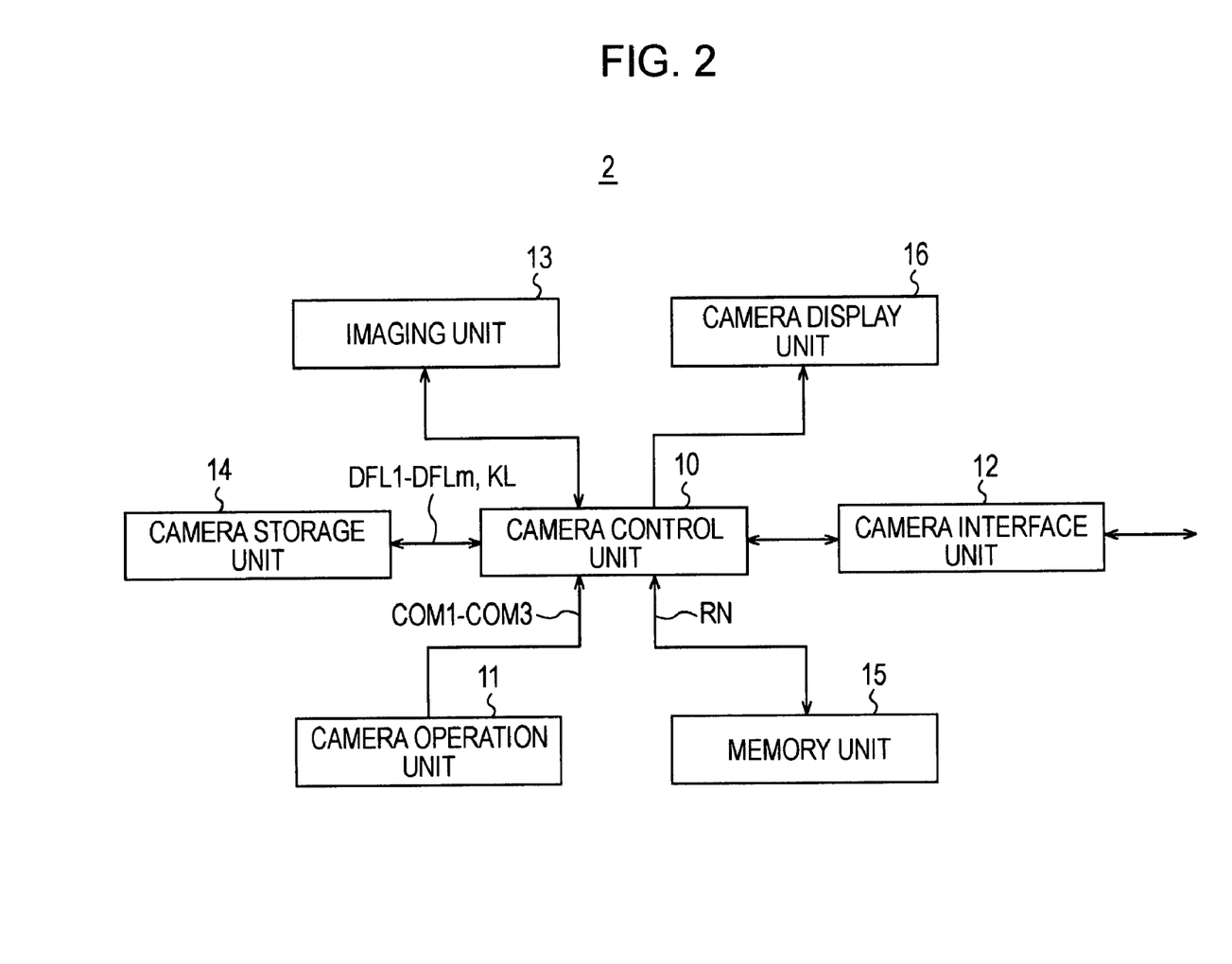
FIG. 2 is a block diagram of a video camera according to the embodiment.

Referring to FIG. 2, the video camera 2 includes a camera control unit 10, a camera operation unit 11, a camera interface unit 12, an imaging unit 13, a camera storage unit 14, a memory unit 15, and a camera display unit 16 the respective units being connected to each other. The camera control unit 10 controls the whole of the video camera 2. The camera interface unit 12 transmits and receives various data blocks to/from the personal computer 3 (see FIG. 1).

The camera control unit 10 has a structure similar to a computer, i.e., includes a central processing unit (CPU), a read only memory (ROM) storing various programs, and a random access memory (RAM) serving as a work memory of the CPU. The camera control unit 10 receives various commands COM, corresponding to user operations, from the camera operation unit 11 or through the camera interface unit 12 from the personal computer 3.

The camera control unit 10 recognizes the details of the user operation on the basis of each of received commands COM1 to COM3 and executes a process on the basis of the recognition and a program corresponding to the recognition.

(2-1) Imaging Mode

When recognizing that an operation to start imaging is performed in accordance with the imaging command COM1 supplied from the camera operation unit 11, the camera control unit 10 changes the operation mode to an imaging mode and controls the imaging unit 13 and the camera storage unit 14 until the camera control unit 10 recognizes that an operation to stop imaging is performed.

In this case, the imaging unit 13 images a subject per predetermined period of time from the time when the operation to start imaging is recognized up to the time when the operation to stop imaging is recognized and sequentially transmits image data blocks DIM1 to DIMn (n is an integer) obtained by imaging to the camera storage unit 14.

The camera storage unit 14 performs a compression process, based on a predetermined compression coding method, on the image data blocks DIM1 to DIMn sequentially supplied from the imaging unit 13 to generate compressed image data blocks and stores the resultant data blocks as a video file DFLx (x is an integer from 1 to m).

As described above, the camera control unit 10 can store a plurality of video files, each including images captured for a duration of time determined in accordance with the user operation, in the camera storage unit 14.

(2-2) Delete Mode

When recognizing that an operation to delete any video file DFLk (k is an integer from 1 to m) is performed, the camera control unit 10 changes the operation mode to a delete mode and controls the camera storage unit 14. In this instance, the camera storage unit 14 deletes the video file DFLk, specified by the command COM2 supplied from the camera operation unit 11, among the stored video files DFL1 to DFLm.

As described above, the camera control unit 10 can delete the video file DFLk selected in accordance with the user operation.

(2-3) Transfer Mode

When recognizing that a transfer start operation is performed in accordance with a transfer request command COM11 supplied from the personal computer 3, the camera control unit 10 changes the operation mode to a transfer mode and controls the camera interface unit 12 and the camera storage unit 14.

In this case, the camera control unit 10 reads out a video file, specified by the transfer request command COM11 supplied from the personal computer 3, as a video file DFLj (j is an integer from 1 to m) to be transferred among the stored video files DFL1 to DFLm and transmits the read video file DFLj to the camera interface unit 12.

The camera interface unit 12 transmits the video file DFLj supplied from the camera storage unit 14 to a personal-computer (PC) interface unit (not shown) in the personal computer 3 (see FIG. 1).

As described above, the camera control unit 10 can transfer the video file DFLj in response to the transfer request from the personal computer 3.

(2-4) Initialization Mode

When recognizing that an operation to start initialization is performed in accordance with the initialization command COM3 supplied from the camera operation unit 11, the camera control unit 10 changes the operation mode to an initialization mode and controls the camera storage unit 14. In this case, the camera storage unit 14 deletes all of the video files DFL1 to DFLm stored in the camera storage unit 14.

As described above, the camera control unit 10 can delete all of the video files DFL1 to DFLm stored in the camera storage unit 14 in accordance with the user operation.

(3) Storage Management List Control Function

The video camera 2 with the above-described structure includes a function of controlling a storage management list for management of the stored video files DFL1 to DFLm.

(3-1) Storage Management List

Figure 3:
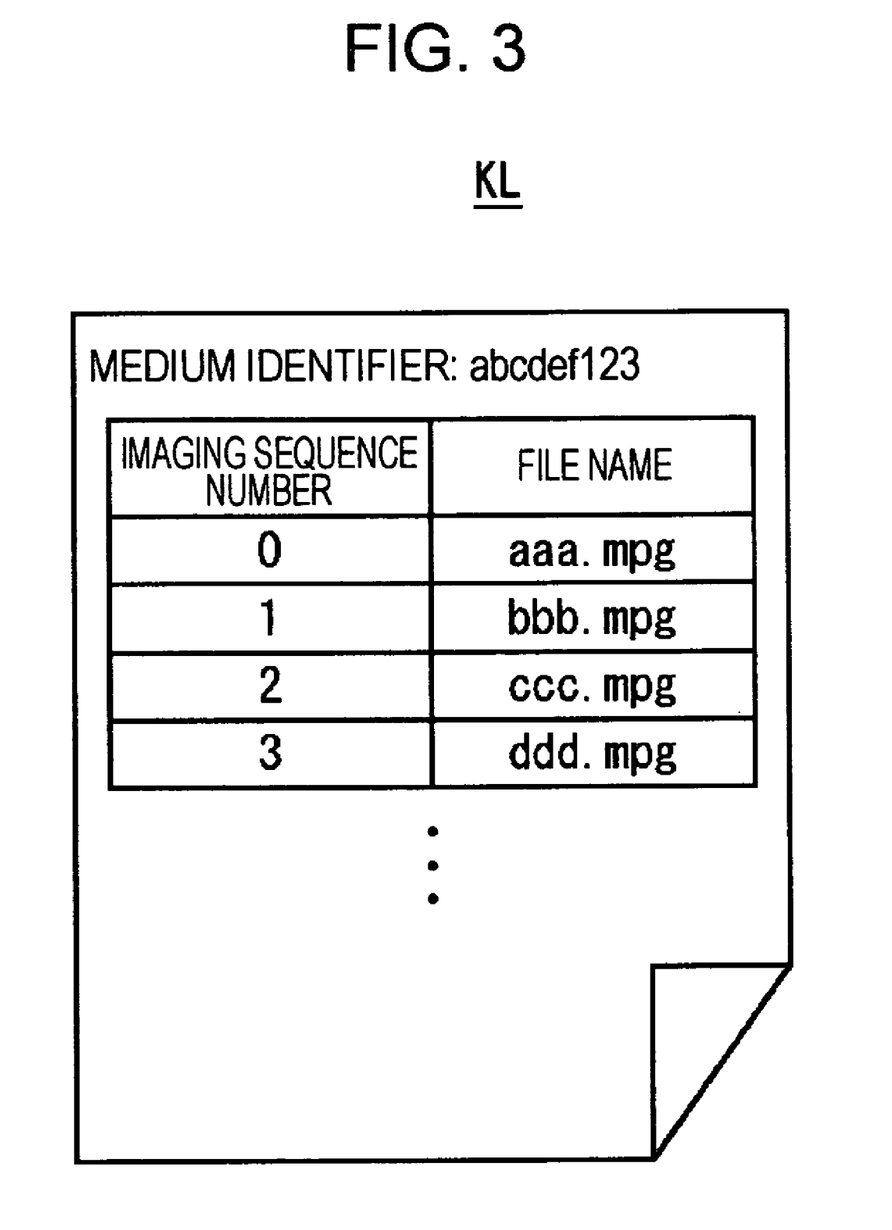
FIG. 3 is a schematic diagram illustrating a storage management list.

Referring to FIG. 3, a storage management list KL contains the file names of the stored video files DFL1 to DFLm, imaging sequence numbers indicating the imaging sequence, and a medium identifier which is assigned to each storage medium.

When the camera storage unit 14 does not store any storage management list upon imaging, the camera control unit 10 generates the storage management list KL.

(3-2) Process of Generating Storage Management List

The camera control unit 10 generates the above-described storage management list KL. The camera control unit 10 sets a random number, which is obtained from a program, as a medium identifier, stores the storage management list KL in the camera storage unit 14, sets an imaging sequence number RN to 0, and stores the set number RN in the memory unit 15. Thus, the storage management list KL is generated.

The camera control unit 10 uses a random number obtained from the program as the medium identifier set in the storage management list KL. Since the medium identifier of the storage management list of the camera storage unit 14 is different from that of a storage management list stored in another storage medium, the personal computer 3 can discriminate between the storage media.

(3-3) Process of Adding Record to Storage Management List

After the camera control unit 10 recognizes that the operation to start imaging is performed, when the video file DFLx is stored in the camera storage unit 14, the camera control unit 10 associates the file name of the video file DFLx with the imaging sequence number RN stored in the memory unit 15 and adds the association as a record to the storage management list KL so that the storage management list KL contains the file name of the generated video file DFLx.

After the addition of the record to the storage management list KL, the camera control unit 10 increments the imaging sequence number RN. Thus, the storage management list KL can be held so as to list the sequence of the imaging sequence numbers of records stored in the storage management list KL.

(3-4) Process of Deleting Record from Storage Management List

After the camera control unit 10 recognizes that the operation to delete the video file DFLk is performed, when the video file DFLk is actually deleted from the camera storage unit 14, the camera control unit 10 retrieves the file name of the video file DFLk from the storage management list KL and deletes the corresponding record so that the storage management list KL does not contain the name of the file which is not stored in the camera storage unit 14.

Consequently, the storage management list KL can be kept so as not to include the name of the file which is not stored in the camera storage unit 14.

The camera control unit 10 does not change the imaging sequence number RN of the other records stored in the storage management list KL. When adding a new record to the storage management list KL after the deletion of any record, the camera control unit 10 uses the imaging sequence number RN stored in the memory unit 15. The imaging sequence number RN of the deleted record, therefore, is missing.

(4) Descriptions of Processes

The imaging process and the initialization process by the camera control unit 10 will be described below.

(4-1) Imaging Process

Figure 4:
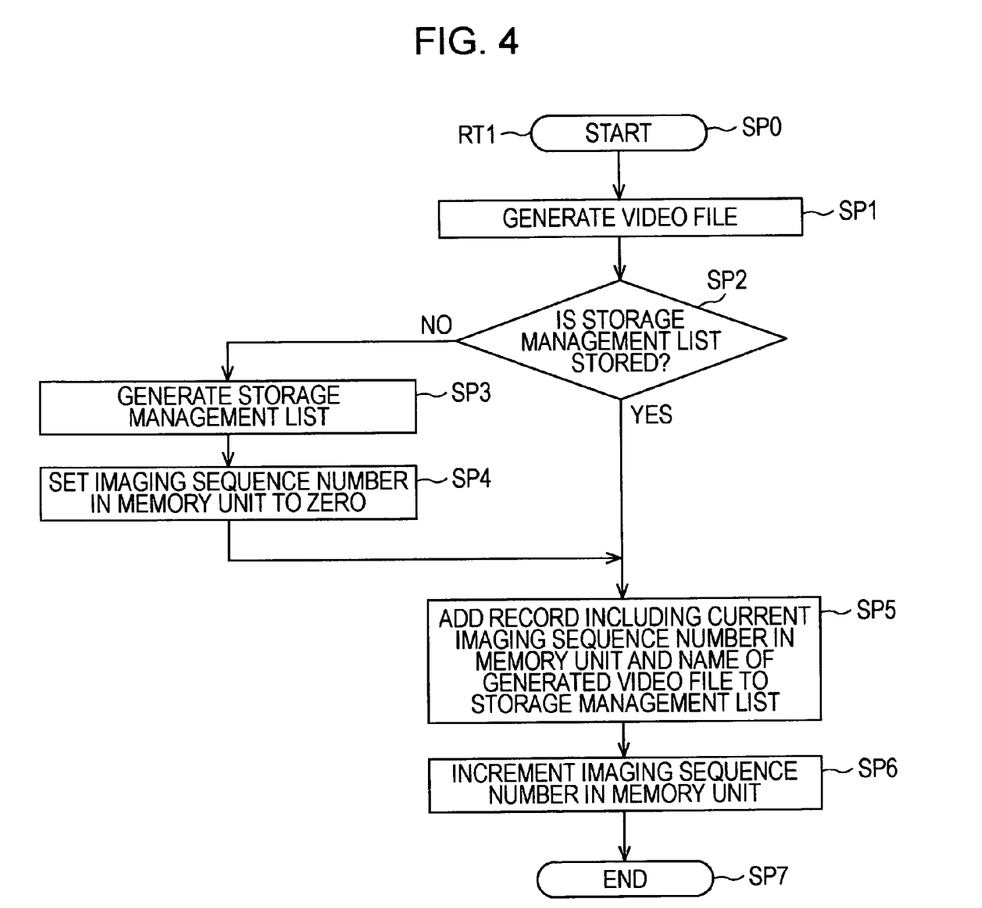
FIG. 4 is a flowchart showing a process of generating a video file.

The imaging process will now be described with reference to a flowchart of FIG. 4.

When the camera control unit 10 recognizes that the operation to start imaging is performed, an imaging process RT1 starts in step SP0. In step SP1, the camera control unit 10 generates a video file DFLx (x is an integer from 1 to m) and stores the file in the camera storage unit 14.

In step SP2, the camera control unit 10 determines whether a storage management list KL is stored in the camera storage unit 14.

If NO in step SP2, the process proceeds to step SP3. In step SP3, the camera control unit 10 generates a storage management list KL (see FIG. 3) and stores the storage management list KL in the camera storage unit 14. The process proceeds to step SP4. In step SP4, the camera control unit 10 sets an imaging sequence number RN in the memory unit 15 to zero.

In step SP5, the camera control unit 10 obtains the imaging sequence number RN stored in the memory unit 15 and adds a record including the imaging sequence number RN and the file name of the video file DFLx to the storage management list KL. The process proceeds to step SP6. In step S6, the camera control unit 10 increments the imaging sequence number RN and stores the incremented number in the memory unit 15. The process proceeds to step SP7 and then terminates.

(4-2) Initialization Process

Figure 5:
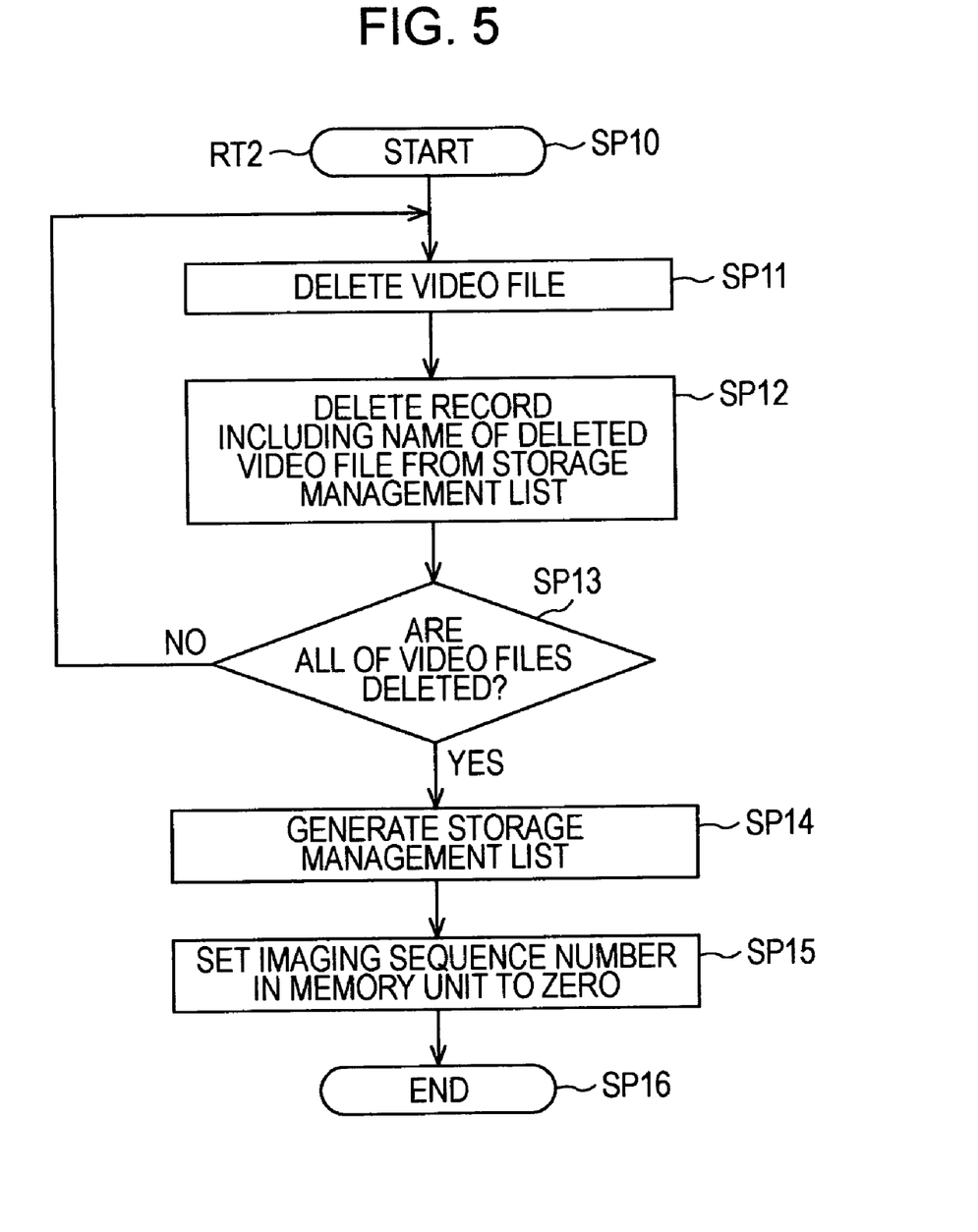
FIG. 5 is a flowchart showing an initialization process.

The initialization process by the camera control unit 10 will now be described with reference to a flowchart of FIG. 5.

When the camera control unit 10 recognizes that the operation to start initialization is performed, an initialization process RT2 starts in step SP10. In step SP11, the camera control unit 10 selects a video file DFLj (j is an integer from 1 to m) to be deleted in a predetermined order and deletes the video file DFLj from the camera storage unit 14. The process proceeds to step SP12.

In step SP12, the camera control unit 10 reads the description of the storage management list KL stored in the camera storage unit 14 and deletes the record including the file name of the deleted video file DFLj from the storage management list KL. The process proceeds to step SP13.

In step SP13, the camera control unit 10 determines whether all of the video files stored in the camera storage unit 14 are deleted. If NO in step SP13, the process is returned to step SP11. The camera control unit 10 deletes the video file DFLj stored in the camera storage unit 14.

If YES in step SP13, the process proceeds to step SP14. The camera control unit 10 generates another storage management list KL, sets a random number obtained from the program as a medium identifier in the storage management list KL, and stores the storage management list KL in the camera storage unit 14. The process proceeds to step SP15, sets the imaging sequence number RN to zero, and stores the set number. The process proceeds to step SP16 and then terminates.

(5) Structure of Computer

Figure 6:
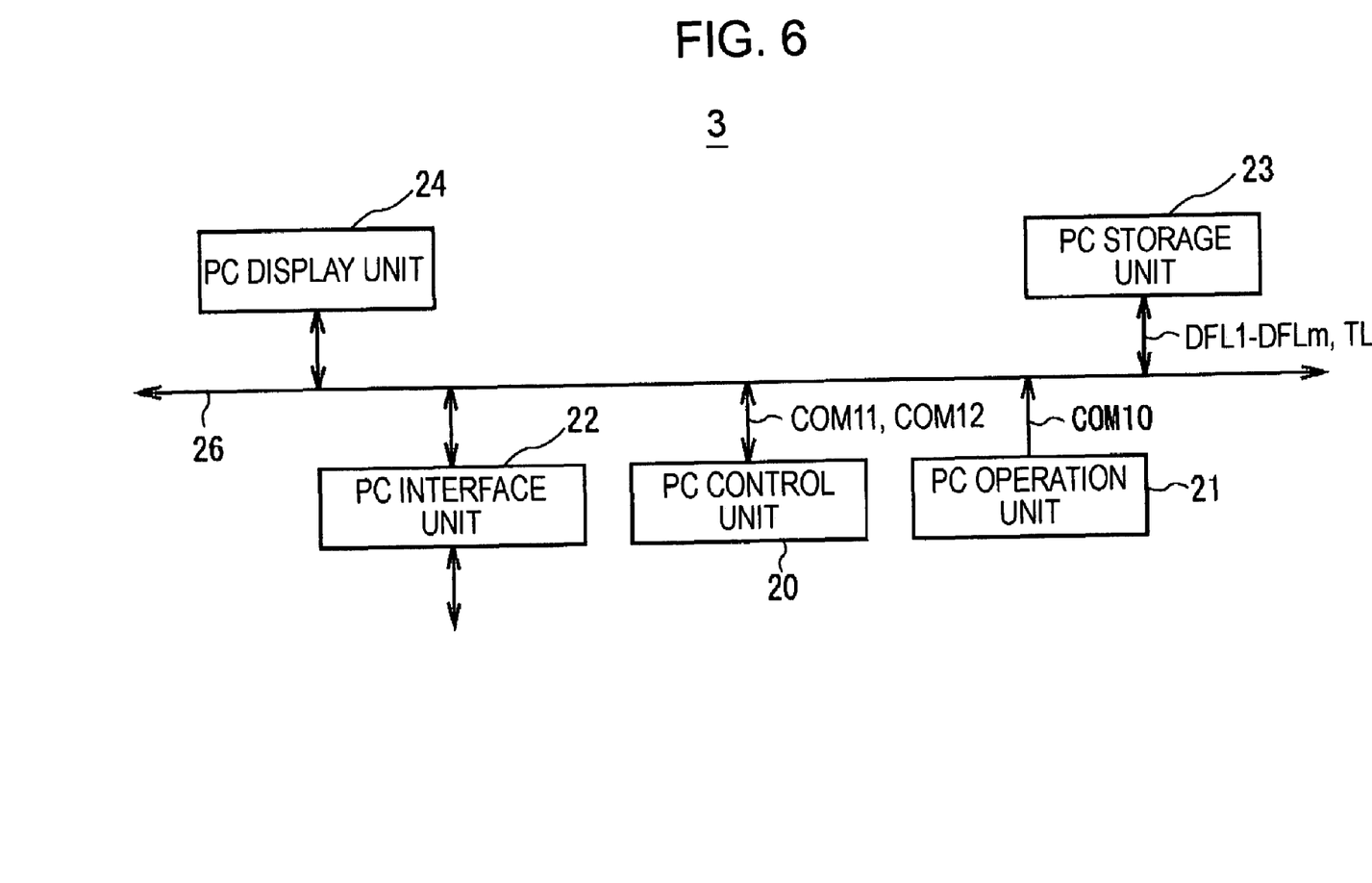
FIG. 6 is a block diagram of a personal computer according to the embodiment.

Referring to FIG. 6, the personal computer 3 includes a personal computer (PC) control unit 20, a PC operation unit 21, a PC interface unit 22, a PC storage unit 23, and a PC display unit 24 connected to each other. The PC control unit 20 controls the entire personal computer 3. The PC interface unit 22 transmits and receives various data blocks to/from the video camera 2 (refer to FIG. 1).

The PC control unit 20 includes a CPU, a ROM storing various programs, and a RAM serving as a work memory of the CPU, the respective components being connected to each other via a bus 26. The PC control unit 20 recognizes the details of an operation by the user on the basis of each of supplied commands COM10 to COM12 and executes a process on the basis of the recognition and a program corresponding to the recognition.

(5-1) Transfer Mode

When the PC control unit 20 recognizes the transfer process command COM10, which is transmitted after the user specifies a transfer process through the PC operation unit 21 while the user is visually confirming the PC display unit 24 and allows the personal computer to execute a program for the transfer process and then specifies various parameters related to a destination where a transferred video file DFLj is stored, the PC control unit 20 recognizes that a transfer start operation is performed. In this case, the PC control unit 20 changes the operation mode to a transfer mode and controls the PC interface unit 22 and the PC storage unit 23 until the unit 20 recognizes that a transfer end operation is performed.

The PC control unit 20 selects a video file DFLj to be obtained in a predetermined order and transmits the transfer request command COM11 related to the video file DFLj to the PC interface unit 22.

The PC interface unit 22 transmits the transfer request command COM11 to the camera interface unit 12. When the camera interface unit 12 transfers the specified video file DFLj to the PC interface unit 22, the PC control unit 20 stores the transferred video file DFLj into a predetermined location in the PC storage unit 23, the location being specified by the parameters. If another video file DFLj is to be obtained, the transfer process is continued. If there is no video file to be obtained, alternatively, if the transfer of the video file DFLj is failed, the transfer process terminates.

(6) Transfer Management List Control Function

The personal computer 3 with the above-described structure has a function of controlling a transfer management list TL for management of transferred files.

(6-1) Transfer Management List

Figure 7:
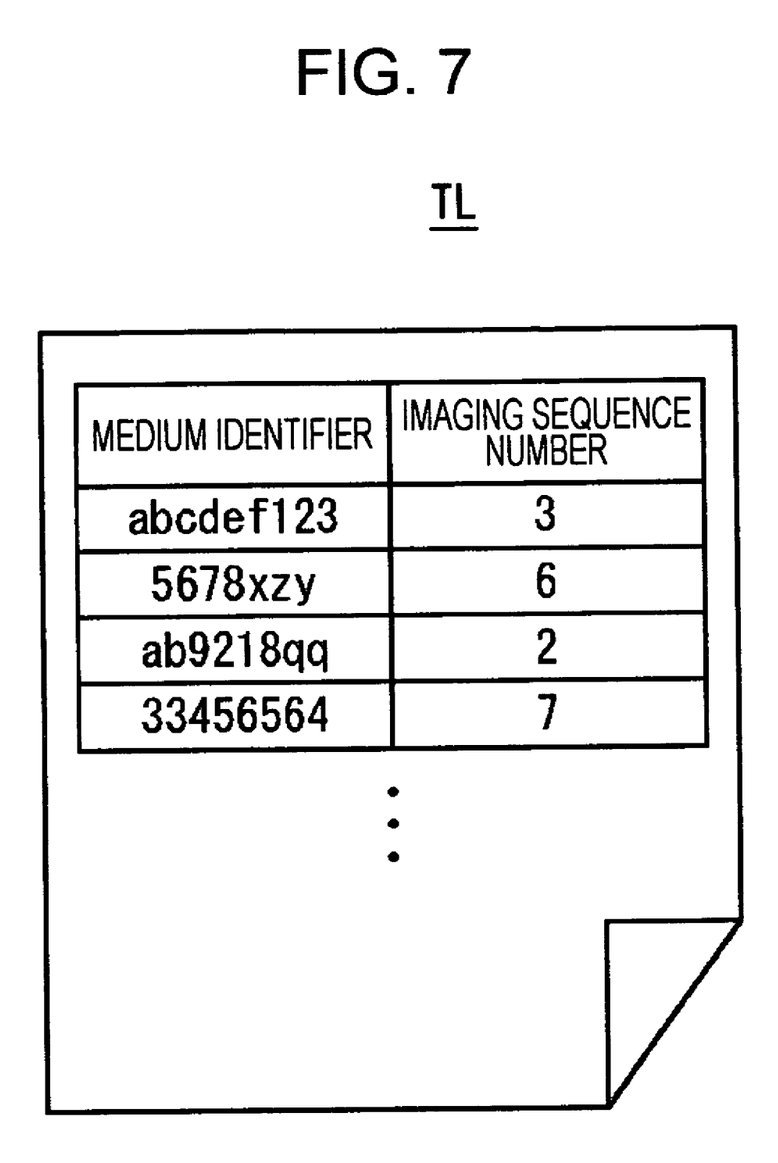
FIG. 7 is a schematic diagram illustrating a transfer management list.

Referring to FIG. 7, the transfer management list TL contains records each including a medium identifier of a medium from which a video file has been transferred and the associated imaging sequence number of the video file most recently transferred from the video camera 2.

When the PC storage unit 23 does not store any transfer management list upon receiving a transferred file, the PC control unit 20 generates a transfer management list TL.

(6-2) Process of Generating Transfer Management List

As described above, the PC control unit 20 generates a transfer management list TL and then stores the transfer management list TL in the PC storage unit 23.

(6-3) Process of Adding Record to Transfer Management List

After the PC control unit 20 recognizes that the transfer start operation is performed, the PC control unit 20 retrieves a medium identifier, contained in the storage management list KL stored in the camera storage unit 14, from the transfer management list TL. If the transfer management list TL does not contain a record including the medium identifier, the PC control unit 20 adds a record including the medium identifier and the imaging sequence number RN of the most recently transferred video file DFLj to the transfer management list TL after completion of the transfer process of the video file DFLj.

Consequently, the PC control unit 20 can hold the medium identifier of the medium from which a file has been transferred and the imaging sequence number RN of the most recently transferred file in the transfer management list TL.

(6-4) Process of Updating Record in Transfer Management List

After the PC control unit 20 recognizes that the transfer start operation is performed, the PC control unit 20 retrieves the medium identifier, contained in the storage management list KL stored in the camera storage unit 14, from the transfer management list TL. If the transfer management list TL contains a record including the medium identifier, the PC control unit 20 updates the imaging sequence number RN in the record to that of the video file DFLj most recently transferred after completion of the transfer process of the video file DFLj.

Consequently, the PC control unit 20 can store the imaging sequence number RN of the file most recently transferred by the transfer process in the transfer management list TL.

(7) Descriptions of Processes

A transfer process will now be described below. The transfer process by the PC control unit 20 will now be described with reference to a flowchart of FIG. 8.

Figure 8:
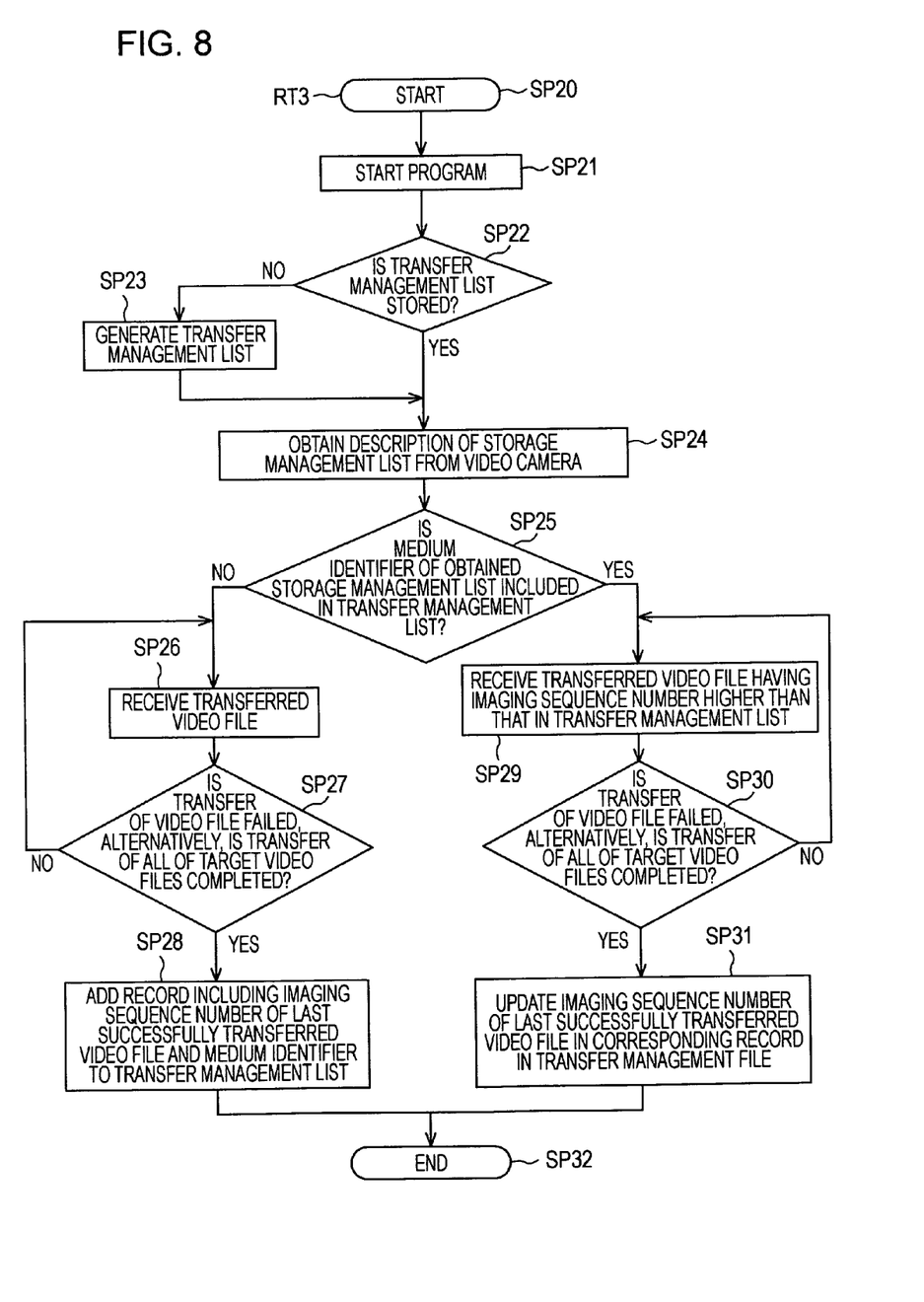
FIG. 8 is a flowchart showing a transfer process.

When the PC control unit 20 recognizes the execution of the program for the transfer process specified by the user through the PC operation unit 21 while the user is visually confirming the PC display unit 24, a transfer process RT3 starts in step SP20.

In step SP21, the PC control unit 20 starts the program stored in the PC storage unit 23. When the user specifies parameters related to, for example, a destination necessary for the transfer process through the PC display unit 24, the process proceeds to step SP22.

In step SP22, the PC control unit 20 determines whether a transfer management list TL is stored in the PC storage unit 23.

If NO in step SP22, the process proceeds to step SP23. The PC control unit 20 generates a transfer management list TL and stores the list in the PC storage unit 23.

If YES in step SP22, the process proceeds to step SP24. The PC control unit 20 transmits a storage-management-list request command COM12 through the PC interface unit 22 to the video camera 2, the command COM12 causing the video camera 2 to transmit information regarding the description of the storage management list KL stored in the medium in the video camera 2. Then, the PC control unit 20 obtains the information regarding the description of the storage management list KL supplied from the video camera 2 in response to the command COM12 and stores the information in the RAM of the PC control unit 20. The process proceeds to step SP25.

In step S25, the PC control unit 20 refers to the transfer management list TL stored in the PC storage unit 23, holds information regarding the description of the transfer management list TL in the RAM of the PC control unit 20, and determines whether the medium identifier contained in the storage management list KL stored in the RAM is included in the transfer management list TL. If NO in step SP25, this means that a video file DFLj stored in the camera storage unit 14 has not been transferred to the personal computer 3. The process proceeds to step SP26.

In step SP26, the PC control unit 20 transmits a transfer request command COM11 to the PC interface unit 22, the command COM11 causing the transfer of the file DFLj, which has the file name associated with the lowest imaging sequence number RN among untransferred files in the storage management list KL held in the RAM of the PC control unit 20. When receiving the video file DFLj transferred from the video camera 2 through the PC interface unit 22, the PC control unit 20 stores the file DFLj in the PC storage unit 23. The process proceeds to step S27.

In step SP27, the PC control unit 20 determines whether the transfer of the video file DFLj is failed, alternatively, the transfer of all of target video files is completed. If NO in step SP27, the process is returned to step SP26.

If YES in step SP27, the process proceeds to step SP28. The PC control unit 20 adds a record including the imaging sequence number RN of the last successfully transferred (i.e., most recently transferred) file and the associated medium identifier to the transfer management list TL. The process proceeds to step SP32 and then terminates.

If YES in step SP25, this means that the video file DFLj stored in the camera storage unit 14 has already been transferred to the personal computer 3. The process proceeds to step SP29. The PC control unit 20 obtains the imaging sequence number RN associated with the corresponding medium identifier in the transfer management list TL held in the RAM and transmits a transfer request command COM11 to the PC interface unit 22, the command COM11 causing the transfer of at least one video file DFLj which is not transferred and has the imaging sequence number RN higher than the obtained imaging sequence number RN. When receiving the video file DFLj through the PC interface unit 22 from the video camera 2, the PC control unit 20 stores the transferred video file in the PC storage unit 23. The process proceeds to step SP30.

In step SP30, the PC control unit 20 determines whether the transfer of the video file is failed, alternatively, the transfer of all of the target video files is completed. If NO in step SP30, the process is returned to step SP29.

If YES in step SP30, the process proceeds to step SP31. In step SP31, the PC control unit 20 updates the record having the corresponding medium identifier so that the record has the imaging sequence number RN of the most recently transferred video file DFLj. The process proceeds to step SP32 and then terminates.

(8) Operation and Advantages

In the file transfer system 1 with the above-described structure, the video camera 2 itself stores and controls the storage management list KL, to which the medium identifier is assigned, containing information regarding the generated files.

On the other hand, the personal computer 3 holds the transfer management list TL containing the relationship between medium identifiers and information regarding transferred files, which are respectively stored in media associated with the medium identifiers, and checks the medium identifier of the storage management list KL obtained from the video camera 2 against the transfer management list TL.

The personal computer 3 distinguishes one or more video files that are not stored in the PC storage unit 23 from video files stored in the camera storage unit 14 and instructs the video camera 2 to transfer the relevant video files. After the process of transferring the video files from the video camera 2 in response to the instruction is completed, alternatively, when the transfer process is interrupted, the personal computer 3 adds or updates information regarding the most recently transferred video file DFLj and the corresponding medium identifier to or in the transfer management list TL.

Consequently, the file transfer system 1 can determine the video file DFLj which has not been transferred and can transfer the video file without rewriting the storage management list KL stored in the video camera 2. Even if the cable 4 is disconnected during the transfer process, the storage management list KL is not damaged. In addition, it is unnecessary to rewrite the storage management list KL in the video camera 2, improving the processing efficiency of the file transfer system 1.

Even if the transfer process is interrupted or failed, only untransferred files including the file failed to be transferred can be transferred by again executing the transfer process because the personal computer 3 holds the transfer management list TL containing information regarding the successfully transferred files.

In the file transfer system 1, when performing the initialization process, the video camera 2 deletes all of the records contained in the storage management list KL and resets a random number as a new medium identifier so that the new medium identifier is different from the previous one set before the initialization process.

It is assumed that the personal computer 3 receives a plurality of video files transferred from the video camera 2, the video camera 2 initializes the camera storage unit 14 and stores a newly generated video file in the camera storage unit 14, and the personal computer 3 allows the video camera 2 to execute the transfer process. Since the medium identifier contained in the storage management list KL of the video camera 2 is reset, the personal computer 3 determines that the camera storage unit 14 has not been subjected to the transfer process though the video files have been transferred from the same camera storage unit 14. Consequently, the personal computer 3 can obtain the newly generated video file during the transfer process.

In addition, in the file transfer system 1, the video camera 2 generates a storage management list KL using a medium identifier assigned to each storage medium, file information regarding a generated video file DFLx, and the imaging sequence number indicating the imaging sequence. Information regarding the description of the storage management list KL is supplied to the personal computer 3.

On the other hand, the personal computer 3 generates a transfer management list TL using a medium identifier assigned to a medium subjected to the transfer process and the imaging sequence number of the most recently transferred file from the medium. The imaging sequence number of the most recently transferred file is associated with the last successfully transferred file during the transfer process. The relevant imaging sequence number RN held in the storage management list KL is set in the transfer management list TL.

In this case, the personal computer 3 obtains information regarding the description of the storage management list KL from the video camera 2 and retrieves the medium identifier contained in the storage management list KL from the transfer management list TL stored in the PC storage unit 23. If the transfer management list TL contains a record including the medium identifier, the personal computer 3 requests the video camera 2 to transfer one or more video files, which have the imaging sequence numbers RN higher than that included in the record in the transfer management list TL, in the imaging sequence shown in the storage management list KL. Since the storage management list KL holds the imaging sequence numbers RN indicating the imaging sequence, the personal computer 3 can obtain untransferred video files.

Accordingly, since the transfer management list TL contains the imaging sequence number RN of the most recently transferred video file DFLj every storage medium, it is unnecessary to allow the transfer management list TL to contain file information regarding all of transferred files. Advantageously, the storage capacity can be reduced. In addition, it is unnecessary to compare file information regarding files contained in the storage management list KL with that in the transfer management list TL, thus improving the processing efficiency.

In addition, since video files are transferred in accordance with the imaging sequence of the storage management list KL, the personal computer 3 reliably obtains and stores the video files in accordance with the imaging sequence. The sequence of the transferred video files is not different from the imaging sequence of the video files. When it is important to use video files in accordance with the imaging sequence, it is unnecessary to rearrange the transferred video files in accordance with the imaging sequence after completion of the transfer process.

In the file transfer system 1 with the above-described structure, the personal computer 3 obtains information regarding the description of the storage management list KL from the video camera 2, compares the storage management list KL with the transfer management list TL stored in the personal computer 3 with respect to a medium identifier to determine an untransferred video file DFLj, receives the video file on the basis of the determination, and adds or updates information regarding the video file DFLj to or in the transfer management list TL.

In the file transfer system 1, if the cable 4 is disconnected during the transfer process, the video camera 2 does not rewrite the stored storage management list KL. Accordingly, incorrect information is not written in the storage management list KL. In addition, since the transfer management list TL contains information regarding successfully transferred files, untransferred video files including a video file DFLj failed to be transferred can be transferred to the personal computer 3 by again executing the transfer process. Consequently, the personal computer 3 can reliably obtain untransferred video files.

(9) Other Embodiments

The foregoing embodiment has described the case where the video camera 2 is connected to the personal computer 3 via the cable 4 based on the predetermined interface standard. The present invention is not limited to the above case. For example, a priority interface, such as Ethernet (registered trademark), or a radio interface, such as IEEE (Institute of Electrical and Electronics Engineers) 802.11a/b/g or Bluetooth (registered trademark), may be used.

The foregoing embodiment has described the case where a file to be transferred is a video file DFLj. The present invention is not limited to the above case. For example, a still image file, an audio file, a text file, and various character files may be transferred.

In addition, the foregoing embodiment has described the case where a random number obtained from the program is used as a medium identifier contained in the storage management list KL. The present invention is not limited to the above case. A value peculiar to a storage medium may be generated using, for example, the serial number of a storage medium and the generation date and time of a storage management list KL and the value may be used as the medium identifier of the storage management list KL.

The foregoing embodiment has described the case where the storage management list KL for video files is used. The present invention is not limited to the above case. A storage management list for video files and a storage management list for still image files, serving as parts of the video files, may be used. A storage management list may be generated every kind of file.

In this case, when the personal computer 3 has a small disk capacity, the file transfer system 1 restricts the kind of file to be transferred to a still image file as a parameter of the program stored in the personal computer 3. Thus, only still image files each having a small file capacity can be transferred.

The foregoing embodiment has described the case where the video files obtained through the video camera 2 are managed in the storage management list KL. The present invention is not limited to the case. For example, a plurality of kinds of files may be managed in the storage management list KL.

The foregoing embodiment has described the case where the personal computer 3 enables the transfer process. The present invention is not limited to the case. For example, various devices, such as a personal digital assistant (PDA) or a mobile phone, capable of executing a program for the transfer process may be used.

The foregoing embodiment has described the case where the camera storage unit 14 of the video camera 2 stores files to be transferred. The present invention is not limited to the case. Files to be transferred may be stored in an external medium, such as a DVD, loaded in the video camera 2.

The foregoing embodiment has described the case where the video camera 2 stores files to be transferred has been described. The present invention is not limited to the case. Files to be transferred may be stored in a device, such as a digital camera, capable of storing files.

The foregoing embodiment has described the case where the video camera 2 generates the storage management list KL in the camera storage unit 14. The present invention is not limited to the case. A storage management list may be generated every storage medium.

The foregoing embodiment has described the case where the personal computer 3 obtains information regarding the description of the storage management list KL in the camera storage unit 14. The present invention is not limited to the case. The storage management list KL may be copied to the PC storage unit 23.

In addition, the foregoing embodiment has described the case where the storage management list KL contains the medium identifier, the imaging sequence numbers, and the file names and the transfer management list TL contains the medium identifiers and the associated imaging sequence numbers. The present invention is not limited to the case. The storage management list KL may contain a medium identifier and various identifiers each specifying a file and the transfer management list TL may contain the medium identifiers and the various identifiers specifying the respective files.

In this case, it is determined whether the storage management list KL contains the same file name as that contained in the transfer management list TL, so that whether the corresponding file has been transferred can be determined during the transfer process.

It should be understood by those skilled in the art that various modifications, combinations, sub-combinations and alterations may occur depending on design requirements and other factors insofar as they are within the scope of the appended claims or the equivalents thereof.

What is claimed is:

1. A destination apparatus configured to receive a file that is transferred thereto, comprising:
   generating means for generating a first list containing a unique medium identifier, assigned to a removable storage medium loaded in a source apparatus that transfers a file, and file information regarding a file transferred from the storage medium;
   storing means for storing the first list;
   list obtaining means for obtaining a second list held in the source apparatus, the second list containing the medium identifier and file information regarding at least one file stored in the storage medium;
   determining means for determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list;
   transferred-file storing means for instructing the source apparatus to transfer the untransferred file and storing the file, transferred from the source apparatus in response to the instruction, in the storing means; and
   destination-list rewriting means for rewriting the first list stored in the storing means on the basis of the file stored in the storing means.

2. The apparatus according to claim 1, wherein
   the file information in the first list includes the storage sequence number of the most recently transferred file among files transferred from the storage medium in accordance with the storage sequence,
   the file information in the second list includes an identifier assigned to each file and the storage sequence number of the file,
   when the second list does not contain the same medium identifier contained in the first list, the determining means determines each file stored in the storage medium as an untransferred file, alternatively, when the second list contains the same medium identifier as that in the first list, the determining means determines each file having the storage sequence number higher than that in the first list as an untransferred file, and
   the transferred-file storing means instructs the source apparatus to transfer the untransferred files in accordance with the storage sequence.

3. The apparatus according to claim 1, wherein the second list is held such that the list is different every kind of file.

4. A source apparatus configured to transfer a file, comprising:
   generating means for assigning a unique medium identifier to a removable storage medium loaded in the apparatus and generating a first list containing the assigned medium identifier and file information regarding at least one file to be stored in the storage medium;
   file storing means for storing the first list and the file in the storage medium;
   list rewriting means for rewriting the first list stored in the storage medium on the basis of the file stored in the storage medium; and
   file transmitting means for transmitting the file and the first list to a destination apparatus, wherein
   the first list is compared to a second list held in the destination apparatus in order to determine an untransferred file through the destination apparatus, the second list containing the medium identifier and file information regarding a file transferred from the storage medium.

5. The apparatus according to claim 4, wherein the generating means resets the medium identifier each time the storage medium is initialized.

6. The apparatus according to claim 4, wherein
   the file information in the first list includes an identifier assigned to the file and the storage sequence number of the file, and
   the file information in the second list includes the storage sequence number of the most recently transferred file among files transferred from the storage medium in accordance with the storage sequence.

7. The apparatus according to claim 4, wherein the first list is held such that the list is different every kind of file.

8. A method for transferring a file from a source apparatus to a destination apparatus, said destination apparatus configured to perform the steps of:
   generating a first list containing a unique medium identifier, assigned to a removable storage medium loaded in the source apparatus that transfers a file, and file information regarding a file transferred from the storage medium;
   storing the first list;
   obtaining a second list held in the source apparatus, the second list containing the medium identifier and file information regarding at least one file stored in the storage medium;
   determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list;
   instructing the source apparatus to transfer the untransferred file and storing the file transferred from the source apparatus in response to the instruction; and
   rewriting the stored first list on the basis of the stored file.

9. A method for managing a file, comprising the steps of:
   assigning by use of a source apparatus a unique medium identifier to a removable storage medium loaded in the source apparatus and generating a first list containing the assigned medium identifier and file information regarding at least one file to be stored in the storage medium;
   storing the first list and the file in the storage medium;
   rewriting the stored first list on the basis of the file stored in the storage medium; and
   transmitting the file and the first list to a destination apparatus,
   wherein the first list is compared to a second list held in the destination apparatus in order to determine an untransferred file through the destination apparatus, the second list containing the medium identifier and file information regarding a file transferred from the storage medium.

10. A computer readable medium having stored thereon a program for file transfer, the program allowing a computer to execute the steps of:
generating a first list containing a unique medium identifier, assigned to a removable storage medium loaded in a source apparatus that transfers a file, and file information regarding a file transferred from the storage medium;
storing the first list;
obtaining a second list held in the source apparatus, the second list containing the medium identifier and file information regarding at least one file stored in the storage medium;
determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list;
instructing the source apparatus to transfer the untransferred file and storing the file transferred from the source apparatus in response to the instruction; and
rewriting the stored first list on the basis of the stored file.

11. A computer readable medium having stored thereon a program for file management, the program allowing a computer to execute the steps:
assigning a unique medium identifier to a removable storage medium loaded and generating a first list containing the assigned medium identifier and file information regarding at least one file to be stored in the storage medium;
storing the first list and the file in the storage medium;
rewriting the stored first list on the basis of the file stored in the storage medium; and
transmitting the file and the first list to a destination apparatus, wherein
the first list is compared to a second list held in the destination apparatus in order to determine an untransferred file through the destination apparatus, the second list containing the medium identifier and file information regarding a file transferred from the storage medium.

12. A file transfer system comprising a source apparatus and a destination apparatus connected to each other via a predetermined transmission path,
the source apparatus including:
source-list generating means for assigning a unique medium identifier to a removable storage medium loaded in the source apparatus and generating a first list containing the assigned medium identifier and file information regarding at least one file to be stored in the storage medium;
file storing means for storing the first list and the file in the storage medium;
list rewriting means for rewriting the first list stored in the storage medium on the basis of the file stored in the storage medium; and
file transmitting means for transmitting the file and the first list to the destination apparatus,
the destination apparatus including:
destination-list generating means for generating a second list containing the medium identifier and file information regarding a file transferred from the storage medium;
destination-list storing means for storing the second list;
source-list obtaining means for obtaining the first list held in the source apparatus;
determining means for determining each file stored in the storage medium as an untransferred file when the first list does not contain the same medium identifier as that contained in the second list, alternatively, comparing the file information in the first list with that in the second list to determine an untransferred file when the first list contains the same medium identifier as that contained in the second list;
transferred-file storing means for instructing the source apparatus to transfer the untransferred file and storing the file, transferred from the source apparatus in response to the instruction, in the destination-list storing means; and
destination-list rewriting means for rewriting the second list stored in the destination-list storing means on the basis of the file stored in the destination-list storing means.

13. A destination apparatus configured to receive a file that is transferred thereto, comprising:
a generating unit generating a first list containing a unique medium identifier, assigned to a removable storage medium loaded in a source apparatus that transfers a file, and file information regarding a file transferred from the storage medium;
a storing unit storing the first list;
a list obtaining unit obtaining a second list held in the source apparatus, the second list containing the medium identifier and file information regarding at least one file stored in the storage medium;
a determining unit determining each file stored in the storage medium as an untransferred file when the second list does not contain the same medium identifier as that contained in the first list, alternatively, comparing the file information in the first list with that in the second list to determine an untransferred file when the second list contains the same medium identifier as that contained in the first list;
a transferred-file storing unit instructing the source apparatus to transfer the untransferred file and storing the file, transferred from the source apparatus in response to the instruction, in the storing unit; and
a destination-list rewriting unit rewriting the first list stored in the storing unit on the basis of the file stored in the storing unit.

14. A source apparatus configured to transfer a file, comprising:
a generating unit assigning a unique medium identifier to a removable storage medium loaded in the apparatus and generating a first list containing the assigned medium identifier and file information regarding at least one file to be stored in the storage medium;
a file storing unit storing the first list and the file in the storage medium;
a list rewriting unit rewriting the first list stored in the storage medium on the basis of the file stored in the storage medium; and
a file transmitting unit transmitting the file and the first list to a destination apparatus, wherein
the first list is compared to a second list held in the destination apparatus in order to determine an untransferred file through the destination apparatus, the second list containing the medium identifier and file information regarding a file transferred from the storage medium.

15. A file transfer system comprising a source apparatus and a destination apparatus connected to each other via a predetermined transmission path, the source apparatus including:

a source-list generating unit assigning a unique medium identifier to a removable storage medium loaded in the source apparatus and generating a first list containing the assigned medium identifier and file information regarding at least one file to be stored in the storage medium;

a file storing unit storing the first list and the file in the storage medium;

a list rewriting unit rewriting the stored first list on the basis of the file stored in the storage medium; and a file transmitting unit transmitting the file and the first list to the destination apparatus, the destination apparatus including:

a destination-list generating unit generating a second list containing the medium identifier and file information regarding a file transferred from the storage medium;

a destination-list storing unit storing the second list;

a source-list obtaining unit obtaining the first list held in the source apparatus;

a determining unit determining each file stored in the storage medium as an untransferred file when the first list does not contain the same medium identifier as that contained in the second list, alternatively, comparing the file information in the first list with that in the second list to determine an untransferred file when the first list contains the same medium identifier as that contained in the second list;

a transferred-file storing unit instructing the source apparatus to transfer the untransferred file and storing the file, transferred from the source apparatus in response to the instruction, in the destination-list storing unit; and a destination-list rewriting unit rewriting the second list stored in the destination-list storing unit on the basis of the file stored in the destination-list storing unit.

* * * * *